(12) United States Patent
Maceroni et al.

(10) Patent No.: US 9,145,858 B2
(45) Date of Patent: Sep. 29, 2015

(54) INTAKE SYSTEM WITH AN INTEGRATED CHARGE AIR COOLER

(75) Inventors: Karen Elizabeth Maceroni, Casco, MI (US); Chris Donald Wicks, Allen Park, MI (US); Daniel Joseph Styles, Canton, MI (US); Mark Michael Madin, Canton, MI (US); Rick L. Williams, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 808 days.

(21) Appl. No.: 13/408,951

(22) Filed: Feb. 29, 2012

(65) Prior Publication Data

US 2013/0220289 A1    Aug. 29, 2013

(51) Int. Cl.
*F02M 25/07* (2006.01)
*F02M 35/10* (2006.01)
*F02M 35/112* (2006.01)
*F02B 29/04* (2006.01)
*F02D 9/10* (2006.01)
*F02D 21/08* (2006.01)

(52) U.S. Cl.
CPC ...... *F02M 35/10255* (2013.01); *F02B 29/0443* (2013.01); *F02B 29/0462* (2013.01); *F02B 29/0475* (2013.01); *F02D 9/1095* (2013.01); *F02D 21/08* (2013.01); *F02M 25/0707* (2013.01); *F02M 25/0709* (2013.01); *F02M 35/10052* (2013.01); *F02M 35/10268* (2013.01); *F02M 35/112* (2013.01); *F02M 25/0731* (2013.01); *F02M 25/0732* (2013.01); *Y02T 10/121* (2013.01); *Y02T 10/14* (2013.01); *Y02T 10/146* (2013.01)

(58) Field of Classification Search
CPC .. F02B 29/0462; F02B 29/0475; F02B 29/04; F02B 29/045; F02B 29/0443; F02M 35/10026; F02M 35/10255; F02M 35/10268; F02M 35/10327; F02M 35/10052; F02M 35/10039
USPC ............................................ 123/442, 568.12
See application file for complete search history.

(56) References Cited

U.S. PATENT DOCUMENTS

| | | | |
|---|---|---|---|
| 6,293,264 B1 * | 9/2001 | Middlebrook | 123/563 |
| 6,513,507 B2 | 2/2003 | Balekai et al. | |
| 7,255,160 B2 * | 8/2007 | Wada et al. | 165/173 |
| 7,363,919 B1 | 4/2008 | Styles | |
| 8,677,982 B2 * | 3/2014 | Marimbordes et al. | 123/563 |
| 8,800,637 B2 * | 8/2014 | Bourgoin et al. | 165/51 |
| 2007/0227495 A1 * | 10/2007 | Isaji et al. | 123/306 |
| 2007/0267000 A1 | 11/2007 | Raduenz et al. | |
| 2010/0077996 A1 * | 4/2010 | Pantow et al. | 123/557 |
| 2010/0132355 A1 * | 6/2010 | Michels et al. | 60/605.1 |
| 2011/0100343 A1 * | 5/2011 | Liu et al. | 123/568.12 |
| 2011/0131957 A1 * | 6/2011 | Hepburn et al. | 60/278 |
| 2012/0174576 A1 * | 7/2012 | Vigild et al. | 60/599 |

* cited by examiner

*Primary Examiner* — Thomas Moulis
*Assistant Examiner* — Elizabeth Hadley
(74) *Attorney, Agent, or Firm* — Julia Voutyras; Alleman Hall McCoy Russell & Tuttle LLP

(57) ABSTRACT

An intake assembly in an engine is provided. The intake assembly includes a compressor and a plenum in fluidic communication with the compressor, the plenum having an integrated charge air cooler including a coolant inlet and a coolant outlet in fluidic communication with a coolant passage and cooling plates extending into a plenum enclosure and coupled to the coolant passage. The intake assembly further includes a throttle body coupled to the plenum.

20 Claims, 5 Drawing Sheets

INTAKE SYSTEM WITH AN INTEGRATED CHARGE AIR COOLER

TECHNICAL FIELD

The present application relates an intake system with an integrated charge air cooler in an intake system.

BACKGROUND AND SUMMARY

Many engines utilize compressors in the intake system to provide boost to the engine to increase the pressure in the combustion chamber, thereby increasing the power output of the engine. Some engines also utilize an exhaust gas recirculation (EGR) loop to reduce emission from the engine and/or improve fuel economy. The EGR loop can be either "high pressure" (HP) where the EGR is taken before the turbine and injected after the compressor, or "low pressure" (LP) where the EGR is taken after the turbine and injected before the compressor. For both scenarios, the compressor and the EGR loop increase the temperature of the intake air provided to the cylinders, thereby reducing the density of the air provided to the cylinder. As a result, the combustion efficiency is decreased. To decrease the temperature of the intake air charge air coolers may be positioned in the intake system. In some engines, the charge air cooler may be positioned in a conduit downstream of the compressor and upstream of a throttle as part of the front end cooling module as the charge air cooler is typically air cooled. In other applications, the charge air cooler may be water cooled and mounted in the engine compartment.

The inventors of the present application have recognized a problem in such previous solutions. First, to accommodate the charge air cooler in the pre-throttle position, the volume of the induction system is increased, thereby decreasing the compactness of the induction system and negatively impacting torque response, packaging and EGR control. This is especially true if the charge air cooler is located in the front cooling module, as it is typical for the charge air cooler to be cooled by outside air. Moreover, losses within such an induction system are increased when the size of the system is increased. Additionally, this large throttled volume negatively impacts EGR control. LP EGR suffers from large transport delays negatively affecting its control and ability to improve fuel economy and reduce emissions in the engine. Because HP EGR is typically introduced in the intake manifold, the aforementioned arrangement does not permit the HP EGR to traverse the charge air cooler, reducing its cooling level and ability to improve fuel economy and emissions and not negatively impacting combustion efficiency.

Accordingly, in one example, some of the above issues may be addressed by an intake assembly in an engine. The intake assembly includes a compressor and a plenum in fluidic communication with the compressor, the plenum having an integrated charge air cooler. The charger air cooler may include a coolant inlet and a coolant outlet in fluidic communication with a coolant passage and cooling plates extending into a plenum enclosure and coupled to the coolant passage. Thus, the charger air cooler may be water cooled. The intake assembly further includes a throttle body coupled to the plenum positioned after the integrated charge air cooler. Such an arrangement allows for the benefits of an integrated charge air cooler without unacceptably increasing "throttled volume", which is detrimental to drivability and engine responsiveness. When the charge air cooler is integrated into an intake plenum the throttle volume is reduced, when compared to intake system having a charge air cooler positioned in a separate enclosure. Furthermore, the integration of the charger air cooer into the plenum enables the overall compactness of the intake system may be increased while providing charge air cooling to intake air, avoiding the charge air heating via operation of a compressor or EGR gas delivered to the intake system. As a result, the density of the air provided to the cylinders in the engine is increased, enabling the combustion efficiency to be increased without increasing the overall size of the intake assembly. A portion of the charge air cooler may be positioned in an enclosure of the plenum, thereby reducing the increase in size of the intake assembly when the charge air cooler is integrated into the assembly. Furthermore, the reduction to boosted volume allows for better control of LP EGR, improved cooling of HP EGR as it now traverses the charge air cooler and improved throttle response as the throttle is now located downstream of the main intake plenum and throttled volume is reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-5 are drawn approximately to scale.

DETAILED DESCRIPTION

Embodiments of an intake assembly having a charge air cooler integrated into a plenum are described herein. The intake assembly includes a plenum coupled to a throttle body, the plenum having a housing defining a plenum enclosure. Cooling plates in the charge air cooler extend across the plenum enclosure. When the charge air cooler is integrated into the plenum, the compactness of the intake system is increased while providing charge air cooling to intake air which may be heated via operation of a compressor or EGR gas delivered to the intake system upstream of the plenum. Thus, the charge air cooler enables the boosted volume provided to the engine to be reduced. The reduction in boosted volume enables combustion efficiency to be increased. Furthermore, the reduction to boosted volume allows for better control of a low pressure (LP) exhaust gas recirculation (EGR), if desired.

Moreover, the throttle volume of the intake system is reduced when the charger air cooler is integrated into the plenum when compared to intake systems having a charger air cooler in a housing spaced away from the plenum. Therefore, using an integrated charger air cooler in the intake system decreases throttle volume, thereby improving throttle response.

Additionally, losses in the intake system are also reduced when the charge air cooler is integrated into the plenum due to the decreased intake air flowpath, thereby increasing the efficiency of the intake system. An outlet of a high pressure (HP) EGR loop may be positioned upstream of the plenum and downstream of a compressor in the intake system. The charge air cooler may be water cooled in some examples, enabling greater and more predictable cooling of the charger air in the intake system Moreover, a throttle body may be coupled to the plenum downstream of the cooler. The throttle response is improved when the throttle body is positioned downstream of the plenum and the throttle volume is reduced. Furthermore, the housing of the plenum may include reinforcing ribs extending across its width. In this way, the structural integrity of the plenum may be increased to accommodate for the integration of the charge air cooler.

Figure 1:
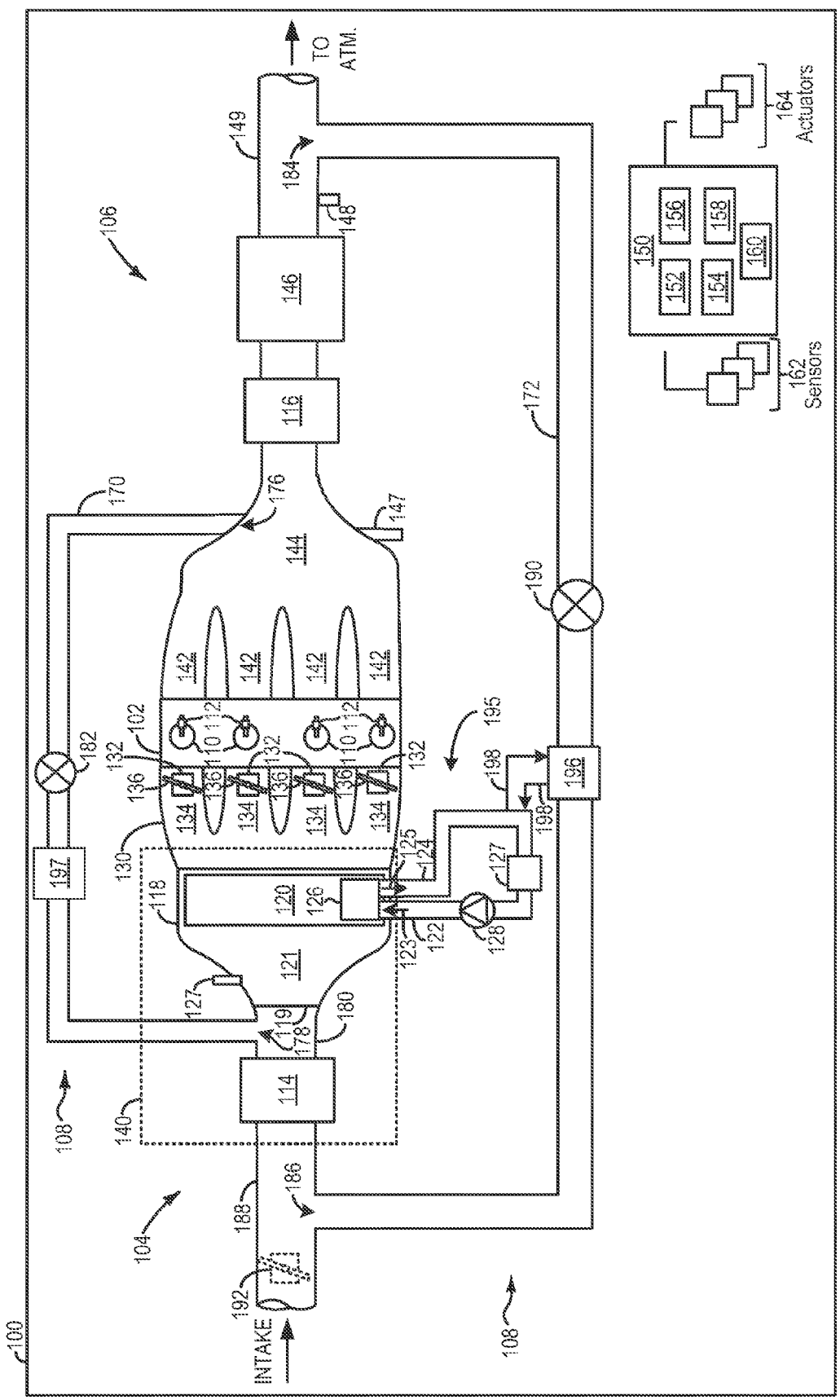
FIG. 1 illustrates a schematic depiction of an example vehicle including an engine, intake system, and exhaust system.

FIG. 1 shows a schematic depiction of a vehicle 100 including an engine 102, an intake system 104, an exhaust system 106, and an exhaust gas recirculation (EGR) system 108.

The intake system 104 is configured to provide intake air to cylinders 110 in the engine 102. The engine is depicted as having 4 cylinders arranged in an inline configuration. However, it will be appreciated that the number of cylinders and/or configuration of the cylinders may be altered in other embodiments. For example, the engine 102 may include 6 cylinders arranged in a V configuration. The intake system 104 is configured to flow intake air to the cylinders and the exhaust system 106 is configured to receive exhaust gas from the cylinders. Additionally, each of the cylinders 110 may include an ignition device 112 configured to ignite an air fuel mixture in the cylinders 110. Additionally or alternatively, compression ignition may be utilized to ignite the air fuel mixture in the cylinders 110. The engine 102 also includes at least one intake and exhaust valve per cylinder.

The intake system includes a compressor 114. The compressor 114 may be included in a turbocharger having a turbine 116 in the exhaust system 106. The compressor 114 and the turbine 116 are rotatably coupled. However, in other examples the compressor 114 may be rotatably coupled to a transmission in the vehicle, providing what is referred to as supercharging.

The intake system 104 further includes a plenum 118 having a charge air cooler 120 integrated therein. The charge air cooler 120 provides charge air cooling to intake air which may be heated via operation of the compressor 114 and the EGR gas delivered to the intake system 104 upstream of the plenum 118. In this way, the boosted volume provided to the engine 102 is reduced. The reduction in boosted volume enables combustion efficiency to be increased in the engine. Furthermore, the reduction in the boosted volume allows for better control of low pressure (LP) exhaust gas recirculation (EGR), discussed in greater detail herein. Moreover, when the charger air cooler 120 is integrated into the plenum 118 the throttle volume is reduced when compared to intake system having a charger air cooler spaced away from the plenum. As a result, the throttle response is improved. The plenum 118 includes an inlet 119 in fluidic communication with the compressor 114. The plenum 118 further includes a plenum enclosure 121. The cross-sectional area in the plenum enclosure 121 perpendicular to the general direction of airflow increases in a downstream direction. Thus, the plenum enclosure 121 includes an expansion and the volume of a plenum enclosure expands in a downstream direction. The specific geometric features of the plenum 118 are discussed in greater detail herein with regard to FIGS. 2-5. The charge air cooler 120 includes a coolant inlet 122 configured to receive coolant and a coolant outlet 124 configured to expel coolant. Thus, the charge air cooler 120 is water cooled in the depicted example. However, in other examples the charger air cooler 120 may be air cooled. Arrow 123 denotes the flow of coolant into the charge air cooler 120 and arrow 125 denotes the flow of coolant out of the charge air cooler 120. The coolant in the charge air cooler 120 may be circulated in a coolant passage 126, generically depicted as a box. However, it will be appreciated that the coolant passage 126 has geometric features that are discussed in greater detail herein with regard to FIGS. 2-5. The coolant inlet and outlet (122 and 124) are in fluidic communication with a heat exchanger 127 and a pump 128. The pump 128 is positioned downstream of the heat exchanger 127 in the depicted embodiment. However, other arrangements have been contemplated. For example, the heat exchanger 127 may be positioned downstream of the pump 128. The heat exchanger 127 is configured to remove heat from the coolant. In this way, heat may be drawn away from the intake system 104 via the charge air cooler 120. Thus, the temperature of the intake air delivered to the cylinders 110 is reduced increasing the air pressure, thereby increasing combustion efficiency. The coolant passage 126, heat exchanger 127, pump 128 and the passages enabling fluidic communication between the aforementioned components may be referred to as a coolant loop 195. In some examples, the coolant inlet 122 and the coolant outlet 124 may be in fluidic communication with a cooling loop separate from the main engine cooling system configured to circulate coolant through the engine. This cooling loop can also be used to service other heat exchangers such as fuel, oil, air conditioning condenser and/or EGR coolers which may desire lower coolant temperatures than the main engine cooling system. In the depicted example, the coolant loop 195 is in fluidic communication with an EGR cooler 196 positioned in the low pressure EGR loop 172. The EGR cooler 196 is configured to transfer heat from the EGR gas travelling through the low pressure EGR loop 172 to the coolant. Arrows 198 denote the flow of coolant to into and out of the EGR cooler 196. A parallel flow configuration is depicted, however in other examples the EGR cooler 196 may be coupled in series in the coolant loop 195. Additionally or alternatively, the coolant loop 195 may be in fluidic communication with an EGR cooler 197 in the high pressure EGR loop 170. Still further in other example, the coolant loop 195 may not be coupled to the EGR cooler 196 and/or the EGR coolers (196 and/or 197) may not be included in the vehicle 100. A pressure sensor 127 may be positioned in a pressure sensor port in the plenum 118.

The intake system 104 further includes a throttle body 130. The throttle body 130 is adjacent to the charge air cooler 120. However, the throttle body 130 may be spaced away from the charge air cooler 120, in other examples. When the throttle body 130 is positioned downstream of the charger air cooler 120 the throttle response may be improved. The throttle body 130 includes a plurality of throttles 132 positioned in a plurality of intake runners 134. Specifically, each of the intake runners 134 has a single throttle positioned therein. Furthermore, each intake runner 134 is in fluidic communication with one of the cylinders 110. In this way, each cylinder has an individual throttle. Each throttle includes a throttle plate 136. Thus, the throttle body 130 includes a throttle plate in each intake of the engine cylinders, in the depicted embodiment. However, in other embodiments an alternate throttle body configuration may be utilized. The throttles 132 are configured to adjust the airflow through each of the runners 134. It will be appreciated that the throttles 132 may be synchronously controlled. That is to say that the throttles 132 may be controlled via a single shaft extending through each of the throttle plates. However, in other examples each throttle may be separately controlled. A controller 150 included in the engine 102 may be used to control operation of the throttles 132.

The compressor 114, plenum 118, and throttle body 130 may be included in an intake assembly 140. Each of the aforementioned components may be coupled directly downstream of one another in consecutive order. However, in other examples just the plenum 118 and the throttle body 130 may be included in the intake assembly 140.

The exhaust system 106 includes a plurality of exhaust runners 142 in fluidic communication with the cylinders 110 and an exhaust manifold 144. The turbine 116 is positioned downstream of the exhaust manifold 144 in the exhaust system 106. Additionally, an emission control device 146 is positioned downstream of the turbine 116. The turbine 116 is rotatably coupled to the compressor 114. A shaft or other suitable component may be utilized to couple the turbine 116 and the compressor 114. However, in other examples the turbine 116 may be omitted from the engine and rotational energy from a transmission in the vehicle 100 may be used to provide rotational energy to the compressor 114. A pressure sensor 147 may be coupled to the exhaust manifold 144. An oxygen sensor 148 may be coupled to a conduit 149 upstream of the emission control device 146.

The EGR system 108 may include at least one of a high pressure EGR loop 170 and a low pressure EGR loop 172. The charge air cooler 120 allows for better control of low pressure EGR loop 170 and improves the cooling of the high pressure EGR loop 172. The high pressure EGR loop 170 includes an inlet 176 opening into the exhaust manifold 144 and an outlet 178 opening into a conduit 180 fluidly coupling the compressor 114 to the plenum 118. In some examples, conduit 180 may be the outlet of the compressor 114. A valve 182 may be included in the high pressure EGR loop 170. In an open position, the valve 182 is configured to enable gas to flow through the high pressure EGR loop 170. In a closed position, the valve 182 is configured to substantially inhibit gas from flowing through the high pressure EGR loop 170. The low pressure EGR loop 172 includes an inlet 184 opening into the conduit 149 and an outlet 186 opening into a conduit 188 upstream of the compressor 114 in the intake system 104. A valve 190 may be included in the low pressure EGR loop 172. It will be appreciated that the delay in the low pressure EGR loop 172 may be reduced when the charge air cooler 120 is integrated into the plenum 118 due to the decreased distance between the outlet of the low pressure EGR loop 172 and the throttle body 130. A throttle 192 may also be positioned in the conduit 188. In an open position, the valve 190 is configured to enable gas to flow through the low pressure EGR loop 172. In a closed position, the valve 190 is configured to substantially inhibit gas from flowing through the low pressure EGR loop 172. In this way, gas may be flowed from the exhaust system 106 to the intake system 104 via the high pressure EGR loop 170 and the low pressure EGR loop 172. For both the high pressure EGR loop 170 and the low pressure EGR loop 172, coolers may be included to provide initial EGR cooling before the mixed air and EGR gases traverse the charge air cooler.

Controller 150 is shown in FIG. 1 as a conventional microcomputer including: microprocessor unit 152, input/output ports 154, read-only memory 156, random access memory 158, keep alive memory 160, and a conventional data bus. Controller 150 is shown receiving various signals from sensors 162 coupled to engine 102, such as a pressure sensor 127, pressure sensor 147, and oxygen sensor 148. The controller 150 may be configured to send signals to actuators 164 such as throttles 132, valve 182, valve 190, and throttle 192.

Figure 2:
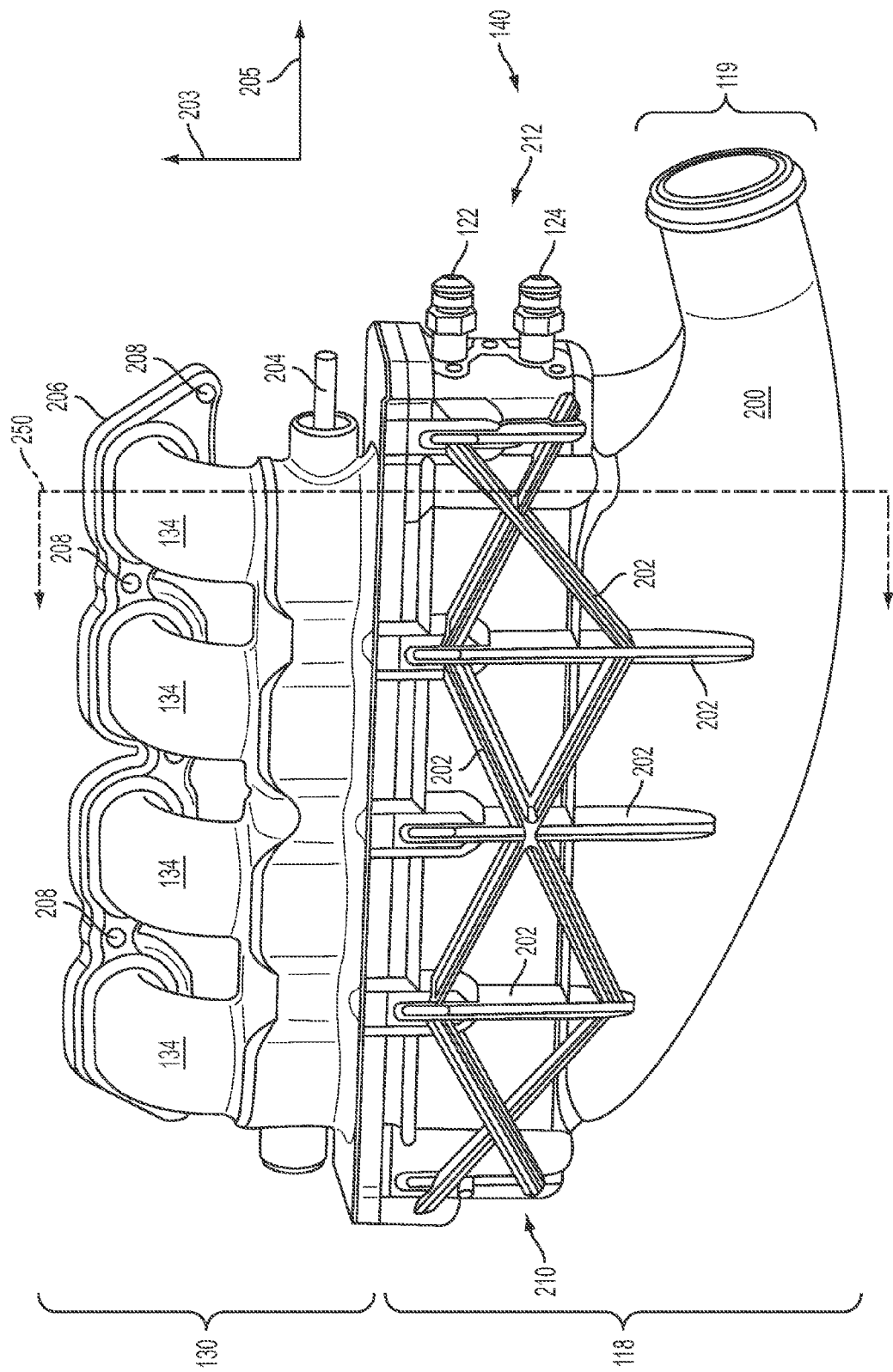
FIGS. 2-5 illustrate an example intake assembly included in the intake system shown in FIG. 1.

FIG. 2 shows an example intake assembly 140. The intake assembly 140 may include the plenum 118 and the throttle body 130. Additionally in some examples, the intake assembly 140 may further include the compressor 114, shown in FIG. 1.

Continuing with FIG. 2, the plenum 118 includes the inlet 119 in fluidic communication with the compressor 114, shown in FIG. 1. In some examples, an outlet of the compressor 114 may be fluidly coupled to the inlet 119. However, in other examples a conduit may separate the compressor 114 and the plenum 118.

Figure 4:
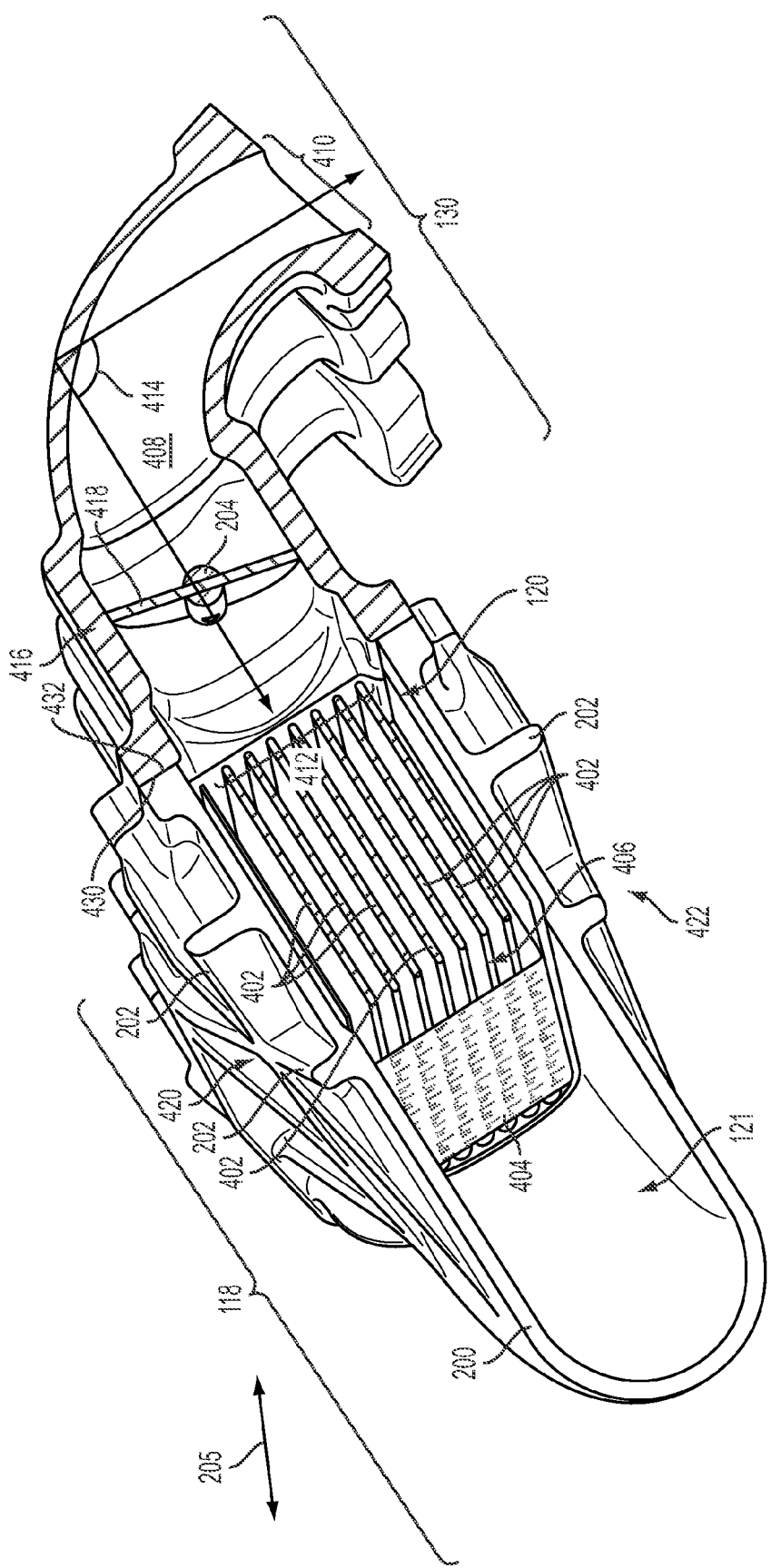

The plenum 118 further includes a plenum housing 200 defining the boundary of the plenum enclosure 121, shown in FIG. 4. Reinforcing ribs 202 may be included in the plenum housing 200. A portion of the reinforcing ribs 202 extend longitudinally down the length of the plenum housing 200. A longitudinal axis 203 is provided for reference. Another portion of the reinforcing ribs 202 extend laterally across the plenum housing 200. A lateral axis 205 is provided for reference. The plenum 118 includes a first lateral side 210 and a second lateral side 212. The reinforcing ribs 202 provide increased rigidity to the plenum housing 200 to accommodate the additional forces exerted on the plenum housing 200 via the charge air cooler 120.

The plenum 118 is coupled to the throttle body 130. A suitable attachment technique such as welding, bolting, etc., may be used to couple the plenum 118 to the throttle body 130. The throttle body 130 includes runners 134. The throttle body 130 further includes an actuation shaft 204 configured to actuate the throttles 132, shown in FIG. 3. The throttle body 130 includes an attachment flange 206 configured to attach to downstream components such as the engine 102 shown in FIG. 1. The attachment flange 206 includes attachment openings 208 configured to receive bolts or other attachment apparatuses.

The coolant inlet 122 and the coolant outlet 124 are also shown in FIG. 2. As previously discussed the coolant inlet 122 and the coolant outlet 124 are in fluidic communication with a coolant passage in the plenum 118. In some examples, the coolant may travels inside cooling plates in the charge air cooler, cooling the charger air flowing through the plenum 118. Cutting plane 250 defines the cross-section shown in FIG. 4.

The plenum housing 200 of the plenum 118 may comprise a metal such as aluminum, steel, a composite material such as glass reinforced polymer, etc. Additionally, the throttle body 130 may comprise a polymeric material, due to the reduction in temperature provided by the charge air cooler 120 in the plenum 118. In this way, the weight of the throttle body 130 is reduced when compared to throttle bodies that are constructed out of metal.

Figure 3:
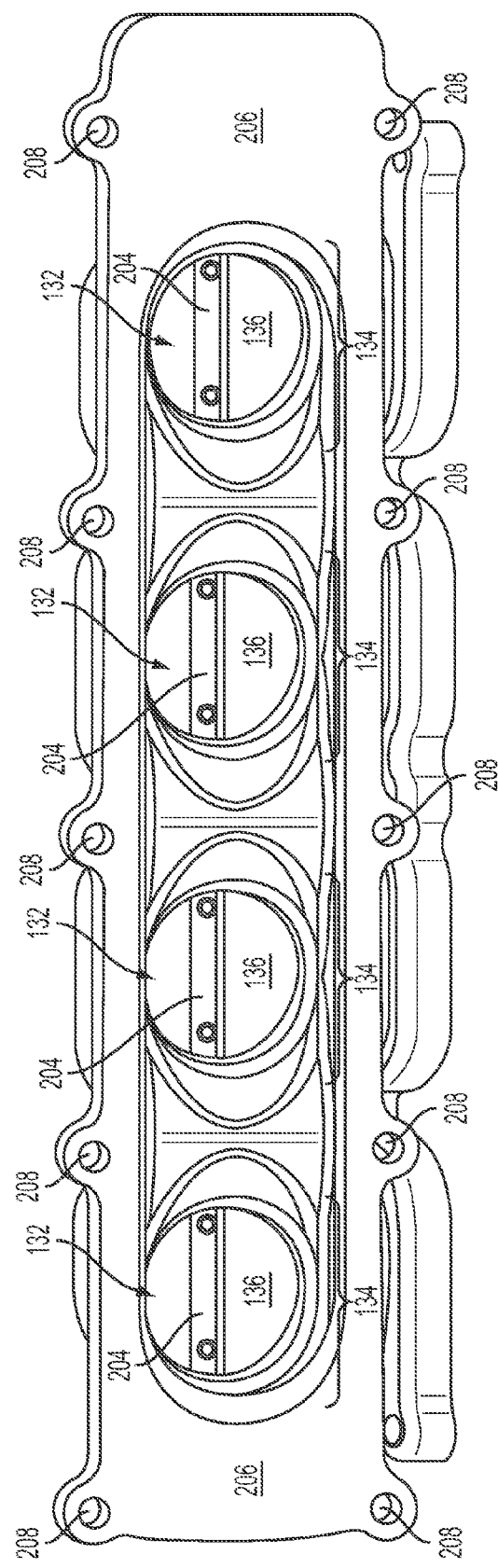

FIG. 3 shows another view of the intake assembly 140 shown in FIG. 2. The throttles 132 having throttle plates 136 are shown positioned in the runners 134. The actuation shaft 204 is also depicted in FIG. 3. As shown, the actuation shaft 204 is coupled to each of the throttle plates 136. The attachment flange 206 including attachment opening 208 is also depicted. The attachment flange 206 may be configured to attach to a cylinder head in the engine 102, shown in FIG. 1.

It will be appreciated that the throttle response of the throttles 132 in the intake assembly 140 may be improved due to the compactness of the assembly when compared to other intake systems having the throttle positioned upstream of the plenum in an additional intake conduit, thereby lengthening the intake system and increasing the throttled volume.

FIG. 4 shows a cross-sectional view of the intake assembly 140 shown in FIG. 2. The plenum enclosure 121 defined by the plenum housing 200 of the plenum 118 is shown. The cross-sectional area of the plenum enclosure 121 perpendicular to the general direction of airflow increases in a downstream direction. Thus, the plenum enclosure 121 includes an expansion. A portion of the charge air cooler 120 including cooling plates 402, are depicted. Each of the cooling plates 402 may include a coolant passage in fluidic communication with the coolant inlet 122 and the coolant outlet 124, shown in FIG. 4. In some examples, the coolant passages in the cooling plates 402 are coupled in series. Therefore, the general direction of coolant flow in consecutive cooling plates may oppose one another. However, other flow patterns have been contemplated. For example, an upper half of the cooling passages may flow coolant across the plenum in a first direction and a lower half of the cooling passage may flow coolant across the plenum in an opposite direction.

The charge air cooler 120 is positioned downstream of the expansion in the depicted embodiment. However, in other embodiments the charge air cooler 120 may be at least partially positioned in the expansion. The cooling plates 402 extend laterally across the plenum 118. The lateral axis 205 is provided for reference. Thus, the cooling plates 402 extend from a first lateral side 210 of the plenum 118, shown in FIG. 2, to a second lateral side 212 of the plenum. Thus, the plates 402 span the width of the plenum enclosure 121. However, in other examples the plates 402 may not fully extend across the width of the plenum enclosure 121. Although the cooling plates 402 are planar in the depicted embodiment, in other embodiments they may be corrugated. In this way, the cooling plates 402 heat transfer from the intake air to the cooling plates 402 may be increased.

Furthermore, the charge air side 412 of the charge air cooler may include fins 404 with turbulence increasing geometries to increase heat transfer surface area and effectiveness. The fins 404 may be vertically and/or longitudinally aligned. Furthermore, the fins 404 are positioned on an upstream side of the plates 402. Thus, passages in the cooling plates 402 may receive coolant from the coolant inlet 122 shown in FIG. 3 and flow coolant to the coolant outlet 124 shown in FIG. 3. Therefore, the coolant flow in the passages may be substantially perpendicular to the airflow through the plenum enclosure 121. The cooling plates 402 may comprise a metal such as aluminum with high thermal conductivity, etc.

A runner 408 included in the plurality of runners 134 is also depicted. As shown, the runner 408 alters the direction of the air flowing therethrough. Specifically, the outlet 410 of the runner 408 is arranged at an angle 414 less than a 90 degree angle with respect to the inlet 412 of the runner 408. However, other geometric configurations have been contemplated. A throttle 416 including a throttle plate 418 included in the plurality of throttles 132 is also shown. The actuation shaft 204 is shown extending through the throttle plate 418. When the runner 408 is positioned in this way the likelihood of condensation from the charge air cooler 120 flowing into the runner 408 is reduced.

The plenum housing 200 of the plenum includes a throttle body attachment interface 430 in face sharing contact with a plenum attachment interface 432. Bolts or other suitable attachment apparatuses may be used to couple the aforementioned interfaced to one another. In this way, the plenum 118 and the charge air cooler 120 are attached to each other. Reinforcing ribs 202 are also shown in FIG. 4.

Figure 5:
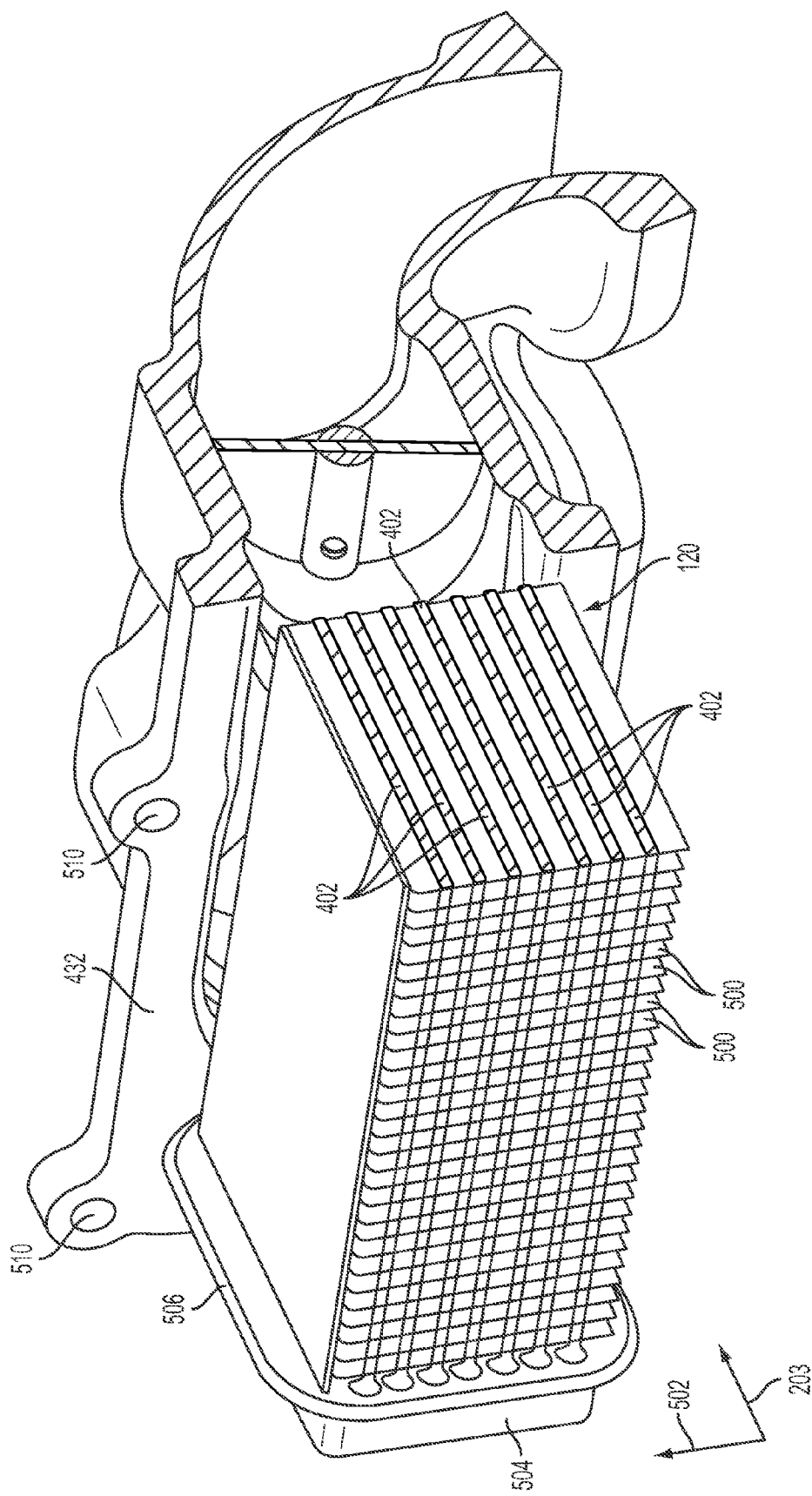

FIG. 5 shows a cut-away view of the intake assembly 140 shown in FIG. 2 with the plenum housing 200, shown in FIG. 2, omitted. The plurality of cooling plates 402 included in the charge air cooler 120 are shown. The charge air cooler 120 is also depicted as having vertical and longitudinally aligned plates 500 in FIG. 5. The vertical axis 502 and the longitudinal axis 203 are provided for reference. As previously described, while the charge air and the EGR may flow in the layers between the cooling plates, vertical fins on the gas side can increase the heat transfer area and turbulence, improving heat transfer effectiveness. A lateral side 504 of the charge air cooler 120 may be in face sharing contact with the plenum housing 200, shown in FIG. 2. This area of the charge air cooler can also provide for a coolant passage end tank, allowing the coolant to traverse the coolant passage in the cooling plates 402 in a "u-flow" pattern, providing for the coolant entry and exit passages to be at the same end of the charge air cooler core. The periphery of the wall 506 of the charge air cooler 120 may also be in face sharing contact with the plenum housing 200. The wall 506 may define a boundary of the plenum enclosure 121 shown in FIG. 2. Thus, wall 506 directs the intake air through the cooling plates 402 of the charge air cooler 120. The plenum attachment interface 432 is also shown. As depicted the plenum attachment interface 432 includes openings 510 configured to receive attachment apparatuses such as bolts.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The invention claimed is:

1. An engine intake assembly, comprising:
a compressor fluidly communicating with a plenum having an integrated charge air cooler including a coolant inlet and a coolant outlet fluidly communicating with a coolant passage having cooling plates coupled thereto which extend into a plenum enclosure; and
a throttle body coupled to the plenum,
wherein a high pressure exhaust gas recirculation loop outlet opens into a conduit fluidly coupling a plenum inlet with a compressor outlet.

2. The intake assembly of claim 1, where a cross-sectional area of the plenum enclosure expands in a downstream direction, a boundary of the plenum enclosure defined by a plenum housing.

3. The intake assembly of claim 2, where the throttle body includes a plurality of throttles, each throttle positioned in an intake runner, each intake runner is in fluidic communication with a cylinder.

4. The intake assembly of claim 1, where the cooling plates include coolant conduits for flowing coolant therethrough.

5. The intake assembly of claim 4, where the coolant flows from a first lateral side of the plenum to a second lateral side of the plenum.

6. The intake assembly of claim 4, where a coolant flow through the coolant conduits is substantially perpendicular to an airflow through the plenum.

7. The intake assembly of claim 1, further comprising a plurality of fins extending across a portion of the plenum enclosure upstream of the charge air cooler, and where the charge air cooler is adjacent the throttle body, the throttle body including a throttle plate in each intake of the engine cylinders.

8. The intake assembly of claim 1, where the plenum includes a housing having reinforcing ribs extending across a width of the housing.

9. The intake assembly of claim 1, where the compressor is rotatably coupled to a turbine in an exhaust system of the engine.

10. The intake assembly of claim 1, further comprising a low pressure exhaust gas recirculation loop in fluidic communication with an intake conduit upstream of the compressor and an exhaust conduit downstream of a turbine.

11. The intake assembly of claim 1, where the cooling plates are planar and span a width of the plenum enclosure.

12. The intake assembly of claim 1, where a housing of the plenum defining a boundary of the plenum enclosure comprises metal and the throttle body comprises a polymeric material.

13. An intake assembly in an engine comprising:
a compressor;
a plenum in fluidic communication with the compressor, the plenum having an integrated charge air cooler including a coolant inlet and a coolant outlet in fluidic communication with a coolant passage and cooling plates extending into a plenum enclosure and coupled to the coolant passage; and
a throttle body coupled to the plenum, the throttle body includes a plurality of throttles, each throttle positioned in an intake runner, each intake runner is in fluidic communication with a cylinder,
wherein an outlet of a high pressure exhaust gas recirculation loop opens into a conduit which fluidly couples the plenum and the compressor upstream of the plenum and downstream of the compressor.

14. The intake assembly of claim 13, where the throttle body includes a plenum attachment interface coupled to a throttle body attachment interface in the plenum via attachment apparatuses.

15. The intake assembly of claim 13, further comprising a low pressure exhaust gas recirculation loop including an outlet opening into an intake passage upstream of the compressor and an inlet opening into an exhaust passage downstream of a turbine in an exhaust system, wherein an additional throttle is arranged in the intake passage upstream of where the outlet of the low pressure exhaust gas recirculation loop opens into the intake passage.

16. The intake assembly of claim 13, wherein the plenum comprises a pressure sensor port.

17. An intake assembly in an engine comprising:
a compressor;
a plenum in fluidic communication with the compressor, the plenum having an integrated charge air cooler including a coolant inlet and a coolant outlet in fluidic communication with a coolant passage and cooling plates extending into a plenum enclosure and coupled to the coolant passage;
a throttle body coupled to the plenum, the throttle body including a plurality of throttles positioned in intake runners, each intake runner in fluidic communication with a cylinder; and
a low pressure exhaust gas recirculation loop including an outlet opening into an intake passage upstream of the compressor and an inlet opening into an exhaust passage downstream of a turbine in an exhaust system,
wherein an outlet of a high pressure exhaust gas recirculation loop opens into a conduit fluidly coupling the plenum and the compressor upstream of the plenum and downstream of the compressor.

18. The intake assembly of claim 17, where the plenum includes an inlet in fluidic communication with the compressor and a volume of a plenum enclosure expands in a downstream direction, a boundary of the plenum enclosure defined by a plenum housing.

19. The intake assembly of claim 2, wherein the charge air cooler is positioned in the plenum enclosure downstream of the expansion.

20. The intake assembly of claim 18, wherein the charge air cooler is positioned in the plenum enclosure downstream of the expansion.

* * * * *